(12) United States Patent
Stefan et al.

(10) Patent No.: US 10,387,644 B2
(45) Date of Patent: *Aug. 20, 2019

(54) SYSTEMS AND METHODS FOR INTRINSIC RUNTIME SECURITY

(71) Applicant: GitStar Inc., San Francisco, CA (US)

(72) Inventors: Deian Stefan, San Francisco, CA (US); Devon Rifkin, San Francisco, CA (US); Christian Almenar, San Francisco, CA (US)

(73) Assignee: GitStar Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/147,396

(22) Filed: Sep. 28, 2018

(65) Prior Publication Data

US 2019/0095617 A1   Mar. 28, 2019

Related U.S. Application Data

(60) Provisional application No. 62/564,807, filed on Sep. 28, 2017.

(51) Int. Cl.
*G06F 21/54* (2013.01)
*G06F 8/75* (2018.01)

(52) U.S. Cl.
CPC .............. *G06F 21/54* (2013.01); *G06F 8/75* (2013.01); *G06F 2221/033* (2013.01)

(58) Field of Classification Search
CPC .................................. G06F 21/54; G06F 8/75
See application file for complete search history.

(56) References Cited

U.S. PATENT DOCUMENTS 9,602,329 B1    3/2017  Stehle
2014/0040638 A1  2/2014  Barton et al.

OTHER PUBLICATIONS

Keil et al. (Transaction-based Sandboxing for JavaScript, arXiv, Jan. 17, 2017, 50 pages) (Year: 2017).*
Phung et al. (A Two-Tier Sandbox Architecture for Untrusted JavaScript, JSTools'12, Jun. 13, 2012, 10 pages) (Year: 2012).*
"International Search Report and Written Opinion of the ISA, dated Dec. 20, 2018, for application No. PCT/US18/53604."

* cited by examiner

*Primary Examiner* — Oleg Korsak
(74) *Attorney, Agent, or Firm* — Jeffrey Schox; Thomas Gwinn

(57) ABSTRACT

A system for intrinsic runtime security includes an application code repository, a security code repository, a trusted execution context, a first sandboxed execution context and a policy enforcement module, operating based on security policy, that enables the first sandboxed execution context to modify objects without enabling unrestricted access of the first sandboxed execution context to original prototypes of the objects.

15 Claims, 3 Drawing Sheets

SYSTEMS AND METHODS FOR INTRINSIC RUNTIME SECURITY

CROSS-REFERENCE TO RELATED APPLICATIONS

This application claims the benefit of U.S. Provisional Application Ser. No. 62/564,807, filed on 28 Sep. 2017, which is incorporated in its entirety by this reference.

TECHNICAL FIELD

This invention relates generally to the computer security field, and more specifically to new and useful systems and methods for intrinsic runtime security.

BACKGROUND

Once a rare occurrence in the software community, major security breaches have now become almost commonplace. This is not surprising: as software has become ubiquitous, so have opportunities to exploit it. The software community has attempted to address the problem of computer security in myriad ways, but these often suffer either from impaired flexibility or inadequate efficacy. For example, traditional runtime security solutions try to defend against application-level attacks via analysis or monitoring; however, this approach may let new or unusually creative exploits slip through the cracks. Thus, there is a need in the computer security field to create new and useful systems and methods for intrinsic runtime security. This invention provides such new and useful systems and methods.

DESCRIPTION OF THE INVENTION EMBODIMENTS

Figure 1:
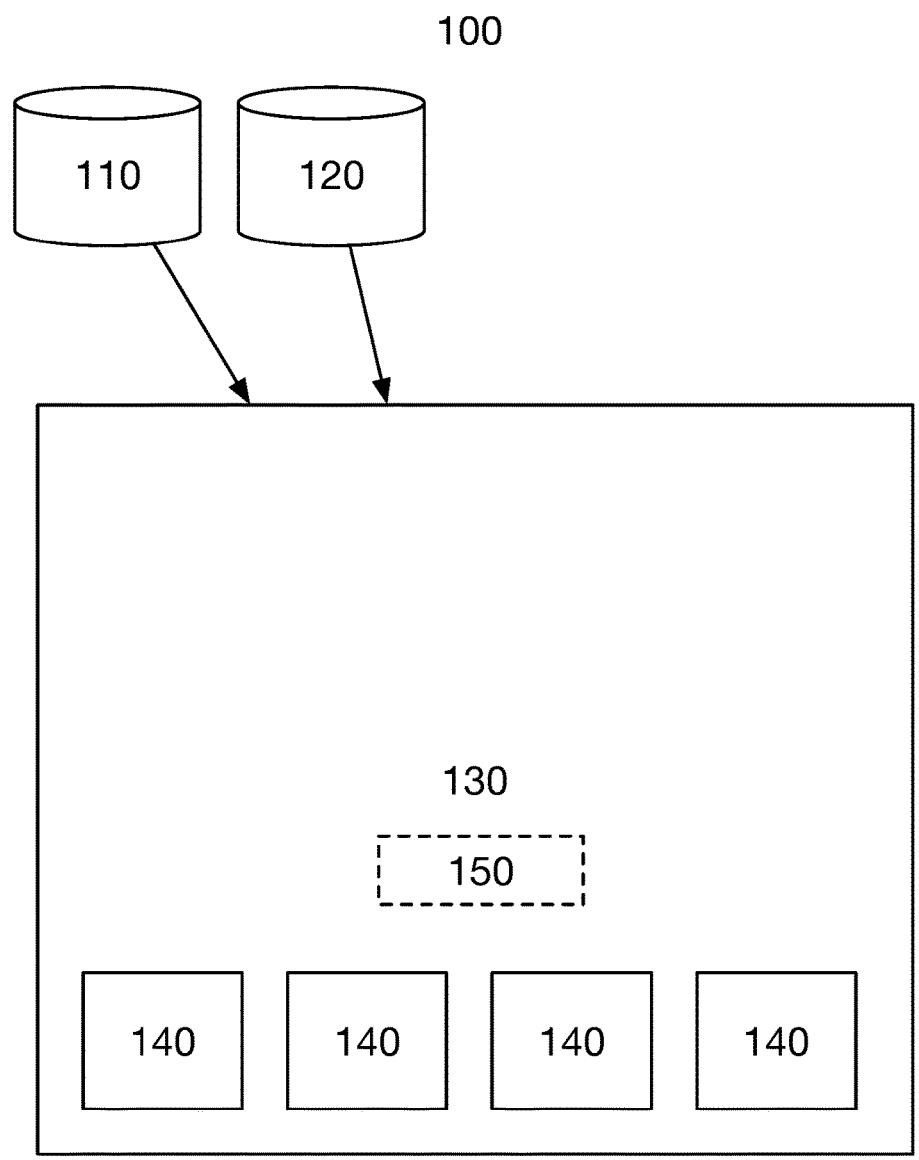
FIG. 1 is a diagram view of a system of an invention embodiment.

The following description of the invention embodiments of the invention is not intended to limit the invention to these invention embodiments, but rather to enable any person skilled in the art to make and use this invention.
1. System for Intrinsic Runtime Security A system 100 for intrinsic runtime security includes an application code repository 110, a security code repository 120, a trusted execution context 130, one or more sandboxed execution contexts 140, and a policy enforcement module 150, as shown in FIG. 1.

The system 100 functions to enable the execution of untrusted code in a safe, flexible, and effective manner. By intelligently executing code (received from the application code repository no) in a trusted execution context 130 or one or more sandboxed execution contexts 140, the system 100 may significantly reduce the risks inherent in running untrusted code. Basing the parameters of operation of the system 100 on security policies (received from the security code repository 120), the system 100 may enable consistent safe execution of any suitable application run with the system 100. Such policies (and in general, interactions between the trusted execution context 130 and sandboxed execution contexts 140) are mediated by the policy enforcement module 150.

The system 100 preferably operates on prototypal languages such as JavaScript (and may be particularly useful for language runtimes like Node.js), but may additionally or alternatively operate on code written in any suitable programming language.

The system 100 is particularly useful for prototypal languages because the sandboxing/virtualization traditionally used in these languages is not designed to prevent malicious code from accessing sensitive system resources. More specifically, the exposure of an object's prototype chain to code executing in a sandbox can potentially lead to exploitation (referred to as prototype tampering or prototype poisoning). When operating on prototypal language applications, the system 100 may mediate access to object prototypes, preventing prototype tampering exploits.

The system 100 is preferably implemented as a library for such a prototypal language, enabling the execution of existing code without modifying runtime systems, but may additionally or alternatively be implemented in any manner.

The application code repository 110 functions to contain application code meant to be executed using the system 100. Likewise, the security code repository 120 functions to contain security policies meant to direct operation of the system 100 while executing the application code. Code stored by the repositories 110 and 120 may be of any type (any set of instructions, compiled or uncompiled); the repositories 110 and 120 may store code in any manner. The security code repository 120 is preferably distinct and isolated from the application code repository 110; alternatively, security code and application code may be stored in the same place. Note that isolating the security code repository 120 may allow the repository 120 to serve as a centralized source of security policy for many different applications. Isolation of the code repositories may be performed in any manner; for example, by requiring one set of credentials (or a first level of access) to modify the application code repository 110, while requiring a different set of credentials (or a second level of access) to modify code in the security code repository 120.

Security policies stored in the security code repository 120 may specify any security parameters of the system 100; e.g., security policies may dictate the operation of the policy enforcement module 150 while running application code.

For example, security policies may be used to determine how code is sandboxed (e.g., which sections of code are executed as trusted vs. untrusted, how execution of untrusted code is distributed across sandboxed execution contexts, permissions and access for individual sandboxed execution contexts, etc.). Security policies may also be used to specify object management between contexts; for example (as discussed in later sections), the system 100 may accomplish secure object sharing between a trusted execution context 130 and a sandboxed execution context 140 using one of several distinct techniques; security policies may be used to specify (e.g., per object type and/or per sandboxed execution context 140) which of these techniques is used to accomplish secure object sharing.

Security policies are preferably whitelist policies; e.g., for each object type, the methods and fields for which access should be provided are explicitly specified (rather than specifying methods and fields for which access should be denied). Additionally or alternatively, security policies may be operable in any manner. For example, security policies may include blacklist policies (e.g., for an object type, the methods and fields for access should not be provided).

The trusted execution context 130 functions to execute code trusted to have unrestricted access to a set of system resources, and in doing so, manage the access of code executed in sandboxed execution contexts 140 to those resources. Of the execution contexts of the system 100, the trusted execution context 130 preferably has the greatest access to system resources (i.e., more than that of any individual sandboxed execution context 140, though the trusted execution context 130 may not necessarily have full access to all resources of a given computer (e.g., code running on a web server that is running in a virtual machine may not have access to the server's BIOS, even if executed in the trusted execution context 130. The system 100 preferably has a single trusted execution context 130 that manages all sandboxed execution contexts 140; additionally or alternatively, the system 100 may have any number of trusted execution contexts 130.

The trusted execution context 130 is preferably used to execute any code designated as trusted in the application code repository no, but may additionally or alternatively execute any code trusted to access the resources available to the context 130. Code may be designated as trusted in any manner; for example, code may be designated as trusted manually; alternatively, code may be designated as trusted automatically based on the source and/or type of code. Note that if code is designated as trusted or not trusted automatically, it may be designated in any manner (e.g., after analysis of the code by the policy enforcement module 150).

Sandboxed execution contexts 140, also referred to as sandboxes, function to execute code not trusted to have unrestricted access to a set of system resources. A sandboxed execution context 140 is preferably used to execute any code not designated as trusted in the application code repository no, but may additionally or alternatively execute any code trusted to access the resources available to a given sandboxed context 140.

Sandboxed execution contexts 140 are linked to one or more trusted execution contexts 130 and are able to access some of the resources available to the trusted execution contexts 130. Compared to trusted execution contexts 130; however, the access and/or privileges of the sandboxed execution contexts 140 are restricted. Note that additionally or alternatively, sandboxed execution contexts 140 may have nested sandboxed execution contexts (for which the higher-level sandboxed execution context operates similarly to a trusted execution context 130.

While the system 100 may have only a single sandboxed execution context 140, the system 100 preferably has multiple sandboxed execution contexts 140.

Given the possibility of multiple sandboxed execution contexts 140, code may be selected to execute in one of them based on any criteria. In a first example, a new sandboxed execution context 140 is created for each separate untrusted program or process executed by the system 100. Alternatively, multiple programs and/or processes may be run in the same sandboxed execution context 140 (e.g., if those programs need substantial access to each other's resources). Note that a single application may likewise be split among a plurality of sandboxed execution contexts 140.

Likewise, the restrictions applied to sandboxed execution contexts 140 may be set in any manner. For example, a security policy may specify the resources that all sandboxed execution contexts 140 have access to (i.e., the access level of every context 140 is identical). Alternatively, levels of access for sandboxed execution contexts 140 may be specified in any manner. For example, a security policy might specify that code from one source is executed in a sandboxed execution context 140 with a first level of access, while code from other sources is executed in a sandboxed execution context 140 with a second level of access lower than the first. As a second example, the level of access given to a sandboxed execution context 140 may be dependent on the type or purpose of code executed by that context 140 (this may be specified manually or inferred automatically based on the code to be executed or in any other manner).

Restrictions applied to sandboxed execution contexts 140 are preferably specified in security policies of the security code repository 120, but may additionally or alternatively be specified or determined in any manner.

Note that objects can be passed back and forth between the trusted execution context 130 and "child" sandboxed execution contexts 140. In some cases, functions can be called across sandbox boundaries, where the context of a function is preferably determined by where it was defined, not who called it. Alternatively, function context may be determined in any manner by the system 100. For example, functions may be restricted, and the system 100 may mediate either or both of function arguments (e.g., by translating or otherwise rewriting them) and return values.

The policy enforcement module 150 functions to make sure that code executed by the system 100 comports with specified security policy. While the policy enforcement module 150 may accomplish this role in many ways (e.g., monitoring and analyzing application behavior at runtime similar to traditional Runtime Application Self-Protection), the policy enforcement module 150 is particularly used to manage resource sharing between a trusted execution context 130 and sandboxed execution contexts 140 (or between different sandboxed execution contexts 140.

In prototypal languages, template objects, referred to as prototypes, (which can be cloned and/or extended) are used as the basis for the creation of new objects. For example, individual "banana" objects (sharing a set of certain fields and methods) may be created from a "banana" prototype (itself an object which designates those fields and methods); the "banana" prototype may in turn be an extended version of a "fruit" prototype (and may be linked to the "fruit" prototype). In this example, changes to the fruit prototype would be propagated to all fruit objects (including the banana prototype, and, via that prototype chain, the banana objects). Likewise, changes to the banana prototype would be propagated to all banana objects. For a given object, the set of links from that object's prototype up until termination (e.g., at the prototype for "object") is known as the prototype chain.

While this aspect of prototypal languages is extremely powerful, it also poses problems for application security in a sandboxed system. It is often desirable for a sandboxed process to be able to modify an object, but if the sandboxed process is able to modify that object's prototype, the process may be able to affect other objects for which access was not intended or to use the object in a non-intended manner to access restricted data or actions. Note that the term "process" here refers to the code run in an individual sandbox, which may be only a part of a larger process (e.g., a single process may be split among a plurality of sandboxes).

Thus, the system 100, via the policy enforcement module 150, preferably prevents sandboxed processes from modifying prototypes of the trusted execution context 130. The system 100 may additionally or alternatively prevent processes of one sandboxed execution context 140 from modifying prototypes belonging to other sandboxed execution contexts 140.

While the policy enforcement module 150 may use any technique to accomplish this directive, four techniques are described herein.

Technique 1: Prototype Isolation

In the first technique, the policy enforcement module 150 clones prototypes to be used in sandboxed execution contexts 140. Objects moved into a given sandboxed execution context 140 have their prototypes changed to the appropriate cloned prototype. For example, an object "fruit1" in the trusted execution context 130 has associated prototype "fruit.prototype" (fruit.prototype is returned by fruit1.prototype), which in turn points to "object.prototype" (object.prototype is returned by fruit1.prototype.prototype), the end of the prototype chain. When moving fruit1 from the trusted execution context 130 to the sandboxed execution context 140, the policy enforcement module 150 replaces the prototype of fruit1 with a copy of fruit.prototype unique to the sandboxed execution context 140 (this copy prototype pointing to a copy of object.prototype also unique to the sandboxed execution context 140). Accordingly, while code in the sandboxed execution context 140 may potentially be able to modify the prototype of fruit1, those modifications will only extend to other objects moved to or allocated in the sandboxed execution context 140. In contrast, if the object is to be passed back to the trusted execution context, modifications to the object's value (unlike the object's prototype) may be passed back into the object. Note that the terms used to define prototypes may vary from language to language; for example, the prototype of object in Javascript is typically referred to as obj._proto_ or Object.getPrototypeOf(obj).

While this protects against exploits of an object's prototype chain resulting from passing the object from the trusted execution context 130 to the sandboxed execution context 140, if code in the trusted execution context 130 passes a prototype as a value, code in the sandboxed execution context 140 may still be able to access it. Accordingly, when using this technique, the policy enforcement module 150 may monitor variables passing between execution contexts. If the policy enforcement module 150 detects that a trusted execution context 130 is attempting to pass a prototype as a value, the policy enforcement module 150 may replace the reference to the prototype with the prototype's copy or may take any other action (e.g., terminating the sandbox, throwing an exception, otherwise indicating an error etc.).

Technique 2: Prototype Restriction

In the second technique, the policy enforcement module 150 creates restricted prototypes to be used in sandboxed execution contexts 140. These restricted prototypes are new prototypes (similar to the cloned prototypes of technique 1), but instead of referencing an entirely new prototype chain they are implemented in terms of a prototype of the trusted execution context 130. The restricted prototype, while still linked to a parent prototype chain, preferably hides direct access to the prototype functions of parent prototypes (i.e., prototypes belonging to the trusted execution context 130.

Similarly to the first technique, objects moved into a given sandboxed execution context 140 have their prototypes changed to the appropriate restricted prototype. Using previous example object fruit1, when moving fruit1 from the trusted execution context 130 to the sandboxed execution context 140, the policy enforcement module 150 replaces the prototype of fruit1 with a restricted version of fruit.prototype unique to the sandboxed execution context 140.

Restrictions may be set or defined in any manner. For example, in one regime, a strict subset of modifications possible in the restricted prototype take effect on the prototype pointed to by the restricted prototype.

Note that restriction may occur at any point in a prototype chain, and likewise, this technique may be combined with the first technique. For example, fruit.prototype (original) may be replaced with fruit.prototype (copy), where fruit.prototype (copy) points to object.prototype (restricted), which in turn references object.prototype (original). As a second example, fruit.prototype (original) may be replaced with fruit.prototype (restricted), where fruit.prototype (restricted) points to fruit.prototype (original), which in turn references object.prototype (original). As a third example, fruit.prototype (original) may be replaced with fruit.prototype (restricted), where fruit.prototype (restricted) points to object.prototype (original) (but restricts access to this prototype). Note that in the third example, the prototype chain is flattened. Such flattening or partial flattening may be used in any technique of the policy enforcement module 150 (e.g., technique 1).

Technique 3: Object Isolation

In the third technique, the policy enforcement module 150 creates placeholder objects to be used in sandboxed execution contexts 140. These placeholder objects are mapped (e.g., using a private WeakMap) to real objects and provide restricted access to the underlying real objects (e.g., via prototype functions, setters, getters).

In this technique, when moving objects into a given sandboxed execution context 140, the policy enforcement module 150 preferably creates a placeholder object and passes the placeholder object to the sandboxed execution context 140. Note that mapping may enable code in the trusted execution context 130 to access the real object given the placeholder. This technique may be useful for magic types with associated C++ code, where direct access to the underlying magic object from a sandboxed execution context 140 could prove dangerous. Note that a magic type is an object type in which type deduction is performed at least partially by a compiler (rather than a programmer).

Technique 4: Prototype Freezing

In the fourth technique, the policy enforcement module 150 creates a "deep-frozen" immutable prototype chain (that cannot be changed, even by the trusted execution context 130). In this technique, when moving objects into a given sandboxed execution context 140, the policy enforcement module 150 preferably replaces the prototype of the object with the deep-frozen prototype change addressed above. This may be useful in cases where an object needs to be easily shared between sandboxed execution contexts 140 or for objects where changing prototypes may have significant performance consequences (e.g., Array.prototype).

All four of these techniques may be performed at any time. For example, the policy enforcement module 150 may perform any technique whenever an object becomes accessible to a sandboxed execution context 140. However, intercepting object sharing in this manner has some difficulties. For example, if a trusted execution context 130 and sandboxed execution context 140 share an object, the trusted execution context 130 may at any point assign a property of the object, making it and its prototype available to the sandboxed execution context 140. Intercepting and moving assigned properties is possible (e.g., via the use of ES6 proxies) but may cause significant performance hits.

Accordingly, the policy enforcement module 150 may adopt a semi-lazy moving strategy. In such a strategy, the policy enforcement module 150 attempts to move objects (i.e., change object properties using one of the four techniques described above) after the sandboxed execution context 140 gets access to the objects but before the sandboxed execution context 140 has a chance to alter its prototype.

In one implementation of an invention embodiment, the policy enforcement module 150 enacts a semi-lazy moving strategy by 1) patching Reflect.getPrototypeOf and Object.getPrototypeOf, 2) redefining the _proto_ property of objects, and 3) also patching constructor.prototype accesses. This strategy may also include preventing trusted code from passing prototypes to a sandboxed execution context 140 as values.

The policy enforcement module 150 preferably patches Reflect.getPrototypeOf and Object.getPrototypeOf (two common ways to get access to prototypes) in each sandboxed execution context 140 such that each of these perform a move action on objects not yet belonging to the sandboxed execution context 140 (i.e., use one of the four techniques previously) prior to returning. Note that this means getPrototypeOf may have side effects on an object (modifying its prototype chain).

While _proto_ is another technique for accessing prototypes, it cannot be patched in the same way. Accordingly, the policy enforcement module 150 preferably redefines _proto_ in the trusted execution context 130 such that Object.prototype._proto_ (when called from a sandboxed execution context 140) will also perform a move action for any objects not belonging to that sandboxed execution context 140.

A similar problem exists for constructor.prototype; however, unlike _proto_ (for which there is a single Object.prototype._proto_), each prototype has its own constructor field. The policy enforcement module 150 preferably addresses this by creating a secure constructor function that modifies the constructor field of prototypes in a similar manner to the above modification to proto (i.e., if the modified constructor field is called from a sandbox for an object that has not yet been moved, that object is moved before returning).

While these details are specific to an implementation of an invention embodiment, it is understood that the policy enforcement module 150 may additionally or alternatively generally modify execution context aspects that might expose prototypes such that objects are moved or prototypes are otherwise protected.

The policy enforcement module 150 may additionally or alternatively move or otherwise modify objects at any time (e.g., based on specified object moves in code). As another example, the policy enforcement module 150 may move all objects accessed by a sandboxed execution context 140, but not immediately (e.g., if an object is accessed by a sandboxed execution context 140, but the prototype has not yet been exposed, that object may still be moved if a certain amount of time has elapsed since access).

2. Method for Intrinsic Runtime Security

Figure 2:
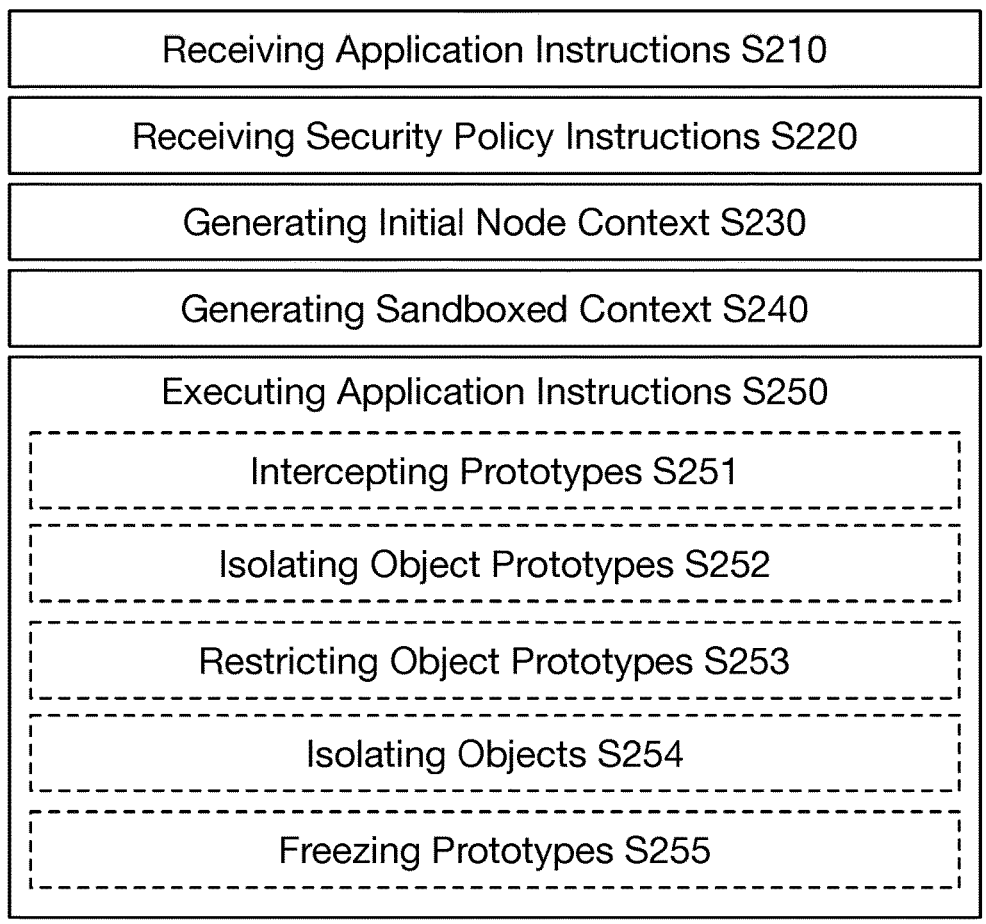
FIG. 2 is a chart view of a method of an invention embodiment.

A method 200 for intrinsic runtime security includes receiving application instructions S210, receiving security policy instructions S220, generating an initial context S230, generating a sandboxed context S240, and executing the application instructions in the sandboxed context S250, as shown in FIG. 2.

Similarly to the system 100, the method 200 functions to enable the execution of untrusted code in a safe, flexible, and effective manner. By intelligently executing code (received in S210) in a trusted execution context (generated in S230) or one or more sandboxed execution contexts (generated in S240), the method 200 may significantly reduce the risks inherent in running untrusted code. Code execution (S250) of the method 200 is preferably performed according to security policy instructions (received in S220).

The method 200 preferably operates on prototypal languages such as JavaScript (and may be particularly useful for language runtimes like Node.js), but may additionally or alternatively operate on code written in any suitable programming language. The method 200 preferably additionally utilizes the system 100, but may additionally or alternatively use any suitable system capable of performing the method 200.

S210 includes receiving application instructions. S210 functions to receive application code, substantially similar to that described in the system 100. S210 may include receiving application instructions in any manner.

S220 includes receiving security policy instructions. S220 functions to receive security policy, substantially similar to that described in the system 100. S220 may include receiving security policy in any manner.

S230 includes generating an initial context. S230 functions to generate a context for executing trusted code. S230 preferably generates an initial context substantially similar to the trusted execution context 130.

S240 includes generating a sandboxed context. S240 functions to generate a sandboxed context for executing untrusted code. S240 preferably generates a sandboxed context substantially similar to the sandboxed execution context 140. Note that sandboxed contexts may be created at any time (e.g., one may be created each time a new process is run, several may be created at the beginning of executing some code, etc.). Further, to the extent that restrictions on sandboxes may be implemented at sandbox creation (e.g., patching a sandbox "getPrototypeOf"), S240 may additionally or alternatively include applying these restrictions at sandbox creation (or at any other time).

S250 includes executing the application instructions in the sandboxed context. S250 preferably includes executing sections of code in the initial context and/or a sandboxed context as described in the description of the system 100.

S250 preferably additionally includes executing application instructions according to security policy received in S220. S250 preferably executes code while modifying application responses as described in the sections on the policy enforcement module 150. For example, S250 preferably includes (while executing code) monitoring access of sandboxed contexts to initial context objects and moving those objects to sandboxed contexts when appropriate. Similar to the policy enforcement module 150, S250 may include preventing sandboxed processes from modifying prototypes of the initial context (and/or of other sandboxed contexts) in any manner.

In an implementation of an invention embodiment, S250 may include one or more of intercepting prototypes named as values S251, isolating object prototypes S252, restricting object prototypes S253, isolating objects S254, and freezing prototypes S255. In S251, upon detection that the initial context is attempting to pass a prototype as a value, the reference to the prototype may be replaced with the prototype's copy or may take any other action (e.g., stopping the code, throwing an error, etc.), as described in the system 100 description. Likewise, S252, S253, S254, and S255 are preferably substantially similar to Techniques 1, 2, 3, and 4 of the system 100 (respectively).

3. Method for Object Management

Figure 3:
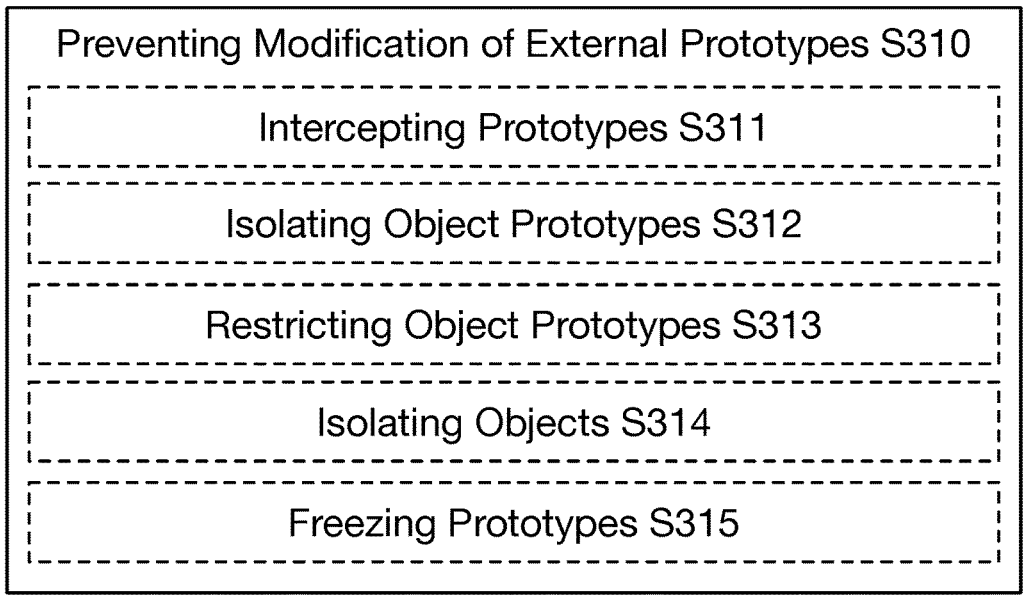
FIG. 3 is a chart view of a method of an invention embodiment.

A method 300 for object management is substantially similar to the object management techniques performed in S250. As shown in FIG. 3, the method 300 includes preventing sandboxed processes from modifying external (i.e., belonging to other contexts) prototypes 310. Similar to the policy enforcement module 150, S310 may include preventing sandboxed processes from modifying prototypes of the initial context (and/or of other sandboxed contexts) in any manner. In an implementation of an invention embodiment, S310 may include one or more of intercepting prototypes named as values S311, isolating object prototypes S312, restricting object prototypes S313, isolating objects S314, and freezing prototypes S315 (substantially similar to S251, S252, S253, S254, and S255 respectively).

The methods of the preferred embodiment and variations thereof can be embodied and/or implemented at least in part as a machine configured to receive a computer-readable medium storing computer-readable instructions. The instructions are preferably executed by computer-executable components preferably integrated with a general computing system. The computer-readable medium can be stored on any suitable computer-readable media such as RAMs, ROMs, flash memory, EEPROMs, optical devices (CD or DVD), hard drives, floppy drives, or any suitable device. The computer-executable component is preferably a general or application specific processor, but any suitable dedicated hardware or hardware/firmware combination device can alternatively or additionally execute the instructions.

As a person skilled in the art will recognize from the previous detailed description and from the figures and claims, modifications and changes can be made to the preferred embodiments of the invention without departing from the scope of this invention defined in the following claims.

We claim:

1. A computing system comprising:
   at least one processor; and
   a computer-readable storage medium coupled to the at least one processor and that stores computer-executable instructions that, when executed by the at least one processor, control the computing system to provide:
   an application code repository that stores application code written in a prototypal language and intended for execution; wherein the application code comprises trusted application code and untrusted application code;
   a security code repository that stores a security policy;
   a trusted execution context, having a first level of access to the computing system, that executes the trusted application code;
   a first sandboxed execution context, having a second level of access to the computing system more restricted than the first level of access, that executes the untrusted application code; wherein the first sandboxed execution context modifies an object present in the trusted application code; and
   a policy enforcement module, operating based on the security policy, that enables the first sandboxed execution context to modify the object without enabling unrestricted access of the first sandboxed execution context to an original prototype of the object,
   wherein the policy enforcement module enables the first sandboxed execution context to modify the object without enabling unrestricted access of the first sandboxed execution context to the original prototype by:
   detecting that the object is to be moved from the trusted execution context to the first sandboxed execution context;
   generating an object copy having a modified object prototype distinct from the original prototype; and
   passing the object copy to the first sandboxed execution context instead of the object, and
   wherein the first sandboxed execution context attempts to modify a second object present in the trusted application code; wherein after detecting that the second object is to be moved from the trusted execution context to the first sandboxed execution context and that the second object contains a second prototype as a value, the policy enforcement module prevents direct access to the second object.

2. The computing system of claim 1, wherein a first level of access is required to modify code of the application code repository; wherein a second and distinct level of access is required to modify code of the security code repository.

3. The computing system of claim 1, wherein the security policy includes whitelist policies that specify, for an object type, methods and fields for which the object type should be provided access.

4. The computing system of claim 1, wherein the application code is designated as trusted or untrusted automatically by the policy enforcement module based on analysis of the application code.

5. The computing system of claim 1, wherein the policy enforcement module provides access to the object after modification by the first sandboxed execution context by modifying a value of the object, without modifying the original prototype, in response to modifications made by the first sandboxed execution context to the object copy.

6. The computing system of claim 1, wherein the policy enforcement module generates the object copy with a prototype chain, including the modified object prototype, entirely unique to the first sandboxed execution context.

7. The computing system of claim 1, wherein the policy enforcement module prevents direct access to the second object by:
   generating a second object copy having a second modified object prototype distinct from an original prototype of the second object; and
   passing the second object copy to the first sandboxed execution context instead of the second object.

8. The computing system of claim 1, wherein the policy enforcement module prevents direct access to the second object by preventing modification of the second object and indicating an error.

9. The computing system of claim 1, wherein the policy enforcement module prevents direct access to the second object by terminating the first sandboxed execution context.

10. A computing system comprising:
    at least one processor; and
    a computer-readable storage medium coupled to the at least one processor and that stores computer-executable instructions that, when executed by the at least one processor, control the computing system to provide:
    an application code repository that stores application code written in a prototypal language and intended for execution; wherein the application code comprises trusted application code and untrusted application code;
    a security code repository that stores a security policy;
    a trusted execution context, having a first level of access to the computing system, that executes the trusted application code;
    a first sandboxed execution context, having a second level of access to the computing system more restricted than the first level of access, that executes the untrusted application code; wherein the first sandboxed execution context modifies an object present in the trusted application code; and a policy enforcement module, operating based on the security policy, that enables the first sandboxed execution context to modify the object without enabling unrestricted access of the first sandboxed execution context to an original prototype of the object, wherein the object has a first prototype chain including a second prototype pointed to by the original prototype; wherein the policy enforcement module enables the first sandboxed execution context to modify the object without enabling unrestricted access of the first sandboxed execution context to the original prototype by:

detecting that the object is to be moved from the trusted execution context to the first sandboxed execution context;

generating an object copy having a modified object prototype distinct from the original prototype; wherein the modified object prototype provides restricted access to the first prototype chain; and passing the object copy to the first sandboxed execution context instead of the object, and wherein the modified object prototype points to the original prototype; wherein a strict subset of modifications possible in the modified object prototype may affect the original prototype.

11. The computing system of claim 10, wherein the modified object prototype points to the second prototype; wherein a strict subset of modifications possible in the modified object prototype may affect the second prototype.

12. The computing system of claim 11, wherein a prototype chain of the object copy is flattened relative to the prototype chain of the object.

13. The computing system of claim 10, wherein the policy enforcement module also generates a second modified object prototype; wherein the second modified object prototype is a copy of the second prototype that provides restricted access and points to the second prototype; wherein the modified object prototype points to the second modified object prototype; wherein a strict subset of modifications possible in the second modified object prototype may affect the second prototype.

14. A computing system comprising:
at least one processor; and
a computer-readable storage medium coupled to the at least one processor and that stores computer-executable instructions that, when executed by the at least one processor, control the computing system to provide:

an application code repository that stores application code written in a prototypal language and intended for execution; wherein the application code comprises trusted application code and untrusted application code;

a security code repository that stores a security policy;

a trusted execution context, having a first level of access to the computing system, that executes the trusted application code;

a first sandboxed execution context, having a second level of access to the computing system more restricted than the first level of access, that executes the untrusted application code; wherein the first sandboxed execution context modifies an object present in the trusted application code; and a policy enforcement module, operating based on the security policy, that enables the first sandboxed execution context to modify the object without enabling unrestricted access of the first sandboxed execution context to an original prototype of the object, wherein the policy enforcement module enables the first sandboxed execution context to modify the object without enabling unrestricted access of the first sandboxed execution context to the original prototype by:

detecting that the object is to be moved from the trusted execution context to the first sandboxed execution context;

generating a placeholder object, mapped to the object, that provides restricted access to the object; and passing the placeholder object to the first sandboxed execution context instead of the object, wherein the policy enforcement module generates the placeholder object only after detecting that the object is of a magic type.

15. The system of claim 14, wherein the placeholder object is mapped to the object by a private WeakMap.

* * * * *